US009190660B2

(12) United States Patent
Takemoto et al.

(10) Patent No.: US 9,190,660 B2
(45) Date of Patent: Nov. 17, 2015

(54) LITHIUM—TITANIUM COMPLEX OXIDE ELECTRODE MATERIAL CONJUGATED WITH FINE CARBON FIBER

(75) Inventors: Hirofumi Takemoto, Ube (JP); Kazuo Hashimoto, Ube (JP); Atsuo Hitaka, Ube (JP)

(73) Assignee: UBE Industries, Ltd., Yamaguchi (JP)

(*) Notice: Subject to any disclaimer, the term of this patent is extended or adjusted under 35 U.S.C. 154(b) by 81 days.

(21) Appl. No.: 13/818,767

(22) PCT Filed: Aug. 25, 2011

(86) PCT No.: PCT/JP2011/069216
§ 371 (c)(1),
(2), (4) Date: Feb. 25, 2013

(87) PCT Pub. No.: WO2012/026544
PCT Pub. Date: Mar. 1, 2012

(65) Prior Publication Data
US 2013/0149612 A1   Jun. 13, 2013

(30) Foreign Application Priority Data

Aug. 26, 2010   (JP) ................................. 2010-189907

(51) Int. Cl.
| | | |
|---|---|---|
| H01M 4/36 | (2006.01) | |
| H01M 4/485 | (2010.01) | |
| H01M 4/587 | (2010.01) | |
| H01M 4/131 | (2010.01) | |
| H01M 4/1391 | (2010.01) | |
| H01M 4/02 | (2006.01) | |

(52) U.S. Cl.
CPC .............. *H01M 4/362* (2013.01); *H01M 4/131* (2013.01); *H01M 4/1391* (2013.01); *H01M 4/364* (2013.01); *H01M 4/485* (2013.01); *H01M 4/587* (2013.01); *H01M 2004/021* (2013.01); *Y02E 60/122* (2013.01)

(58) Field of Classification Search
CPC ..... H01M 4/364; H01M 4/485; H01M 4/587; H01M 4/131; H01M 4/362
USPC ....................................................... 429/231.1
See application file for complete search history.

(56) References Cited

U.S. PATENT DOCUMENTS

| | | | |
|---|---|---|---|
| 6,372,384 B1 | | 4/2002 | Fujimoto et al. |
| 2005/0221170 A1* | | 10/2005 | Takeuchi et al. .............. 429/122 |
| 2006/0141361 A1 | | 6/2006 | Yuasa et al. |
| 2010/0025627 A1 | | 2/2010 | Naoi et al. |

(Continued)

FOREIGN PATENT DOCUMENTS

| | | |
|---|---|---|
| CN | 101 630 732 A | 1/2010 |
| CN | 101 752 560 A | 6/2010 |

(Continued)

OTHER PUBLICATIONS

US 2010/0248034 is an English Translation of WO 2009/081704.*

(Continued)

*Primary Examiner* — Stewart Fraser
(74) *Attorney, Agent, or Firm* — Nixon Peabody LLP; Jeffrey L. Costellia (57) ABSTRACT

The present invention provides an electrode material for a secondary battery wherein the inside and the surface of a lithium-titanium complex oxide is composited with a fine carbon fiber as a network.

19 Claims, 5 Drawing Sheets

(56) References Cited

U.S. PATENT DOCUMENTS

2010/0248034 A1* 9/2010 Oki et al. .................. 429/231.8
2011/0003151 A1* 1/2011 Nishio et al. .................. 428/367
2012/0261622 A1 10/2012 Honma

FOREIGN PATENT DOCUMENTS

| CN | 101 777 645 A | 7/2010 |
|---|---|---|
| EP | 2 228 856 A1 | 9/2010 |
| EP | 2 251 465 A1 | 11/2010 |
| EP | 2 554 517 A1 | 2/2013 |
| JP | 3625680 | 3/2005 |
| JP | 2005-135872 | 5/2005 |
| JP | 2006-164859 | 6/2006 |
| JP | 2006-221881 | 8/2006 |
| JP | 2007-160151 | 6/2007 |
| JP | 2009-238656 | 10/2009 |
| JP | 2009-542562 | 12/2009 |
| WO | WO 2007/143640 A2 | 12/2007 |
| WO | WO 2009/081704 A1 | 7/2009 |
| WO | WO 2009081704 A1 * | 7/2009 |
| WO | WO 2009/110570 A1 | 9/2009 |
| WO | WO 2009110570 A1 * | 9/2009 |
| WO | WO 2011/078112 A1 | 6/2011 |

OTHER PUBLICATIONS

Katsuhiro Naoi et al.—"High-rate nano-crystalline $Li_4Ti_5O_{12}$ attached on carbon nano-fibers for hybrid super capacitors", Journal of Power Sources, 195, (2010), pp. 6250-6254.

D. Peramunage et al.—"Preparation of Micron-Sized $Li_4Ti_5O_{12}$ and Its Electrochemistry in Polyacrylonitrile Electrolyte-Based Lithium Cells", J. Electrochem. Soc., vol. 145, No. 8, Aug. 1998, pp. 2609-2615.

International Preliminary Report on Patentability for PCT/JP2011/069216, Mar. 28, 2013.

Heng L Y, et al., "Demonstration of the advantages of using bamboo-like nanotubes for electrochemical biosensor applications compared with single walled carbon nanotubes", Electrochemistry Communications, vol. 7, No. 12, Nov. 9, 2005, pp. 1457-1462.

Extended European Search Report issued in European Patent App. No. 11820007.0 mailed Jul. 15, 2014.

English-language translation of Chinese Office Action dated Oct. 8, 2014 in a counterpart Chinese Patent Application No. 201180051672.X issued by SIPO.

* cited by examiner

LITHIUM—TITANIUM COMPLEX OXIDE ELECTRODE MATERIAL CONJUGATED WITH FINE CARBON FIBER

TECHNICAL FIELD

The present invention relates to an electrode material for reducing deterioration in cycle properties and for improving discharge properties under high load by improving electron conductivity and lithium-ion mobility in a lithium-titanium complex oxide electrode active material used in a cathode or anode in a lithium secondary battery utilizing intercalation and deintercalation of lithium.

BACKGROUND ART

Recently, as electronic devices have been size-reduced, improved in performance and improved in portability, rechargeable secondary batteries such as a Ni-MH alkali storage battery and a lithium secondary battery have been practically and extensively used. In particular, the use of a lightweight lithium-ion secondary battery with a high energy density has been investigated not only for conventional small information-communications devices such as cell phones and laptop computers, but also for moving vehicles such as automobiles, power sources of rotating bodies such as electric tools and backup power sources which are required to have high-output properties and long-term reliability.

Currently, a cathode active material for a lithium-ion secondary battery is a lithium transition metal complex oxide such as lithium cobalt oxide ($LiCoO_2$), lithium nickel oxide ($LiNiO_2$) and lithium manganese oxide having a spinel structure ($LiMn_2O_4$) which is capable of providing an operating voltage of 4V. Meanwhile, carbon materials are extensively used as an anode active material. Application of a conventional electrode material to industrial applications such as backup system for industrial applications and to an automobile battery which are expected to give rise to great demand, however, has problems to be solved such as drain on resources and a high price, dissatisfactory battery performance and safety.

Recently, a lithium-titanium complex oxide has drawn attention as an electrode active material for a lithium secondary battery used in the above applications. A lithium-titanium complex oxide exhibits a charge-discharge potential nobler than that of a carbon material (a spinel type $Li_4Ti_5O_{12}$ has a potential of about 1.56 V to Li/Li+), and is, therefore, practically used as a cathode active material for a battery in a wristwatch. Among lithium-titanium complex oxides, $Li_4Ti_5O_{12}$ having a spinel type structure has a large amount of lithium ions which can be electrochemically intercalated or deintercalated and exhibits smaller volume change associated with the intercalation and deintercalation, so that it advantageously maintains a crystal structure and exhibits less deterioration caused by charge-discharge cycle. Furthermore, it is known that since a lithium ion exhibits a nobler intercalation/deintercalation potential than that of a carbon material, precipitation of lithium metal at a low temperature and reductive decomposition of a solvent by an anode active material are prevented, resulting in ensuring of safety and a longer battery life. However, for a lithium-titanium complex oxide, an electron conductivity is extremely small, a reaction resistance is large for intercalation/deintercalation of a lithium ion, and charge/discharge under high load leads to significant deterioration in battery properties. It is difficult, therefore, to apply to a battery system for which a higher output is required.

For solving these problems, there have been proposed homogenization of lithium-titanium complex oxide particles, size reduction of the particles and complexing with an electron conductive substance.

Size reduction in lithium-titanium complex oxide particles can increase an area where a reaction proceeds and reduce intra-particle diffusion length of lithium ions and electrons, but mere size reduction of particles causes poor subsequent precipitation (dispersibility) and poor adherence to a collector in producing an electrode and adversely causes deterioration in battery properties such as a capacity and an output, resulting in insufficient improvement in charge/discharge properties under high load (Non-patent Reference No. 1).

Meanwhile, there has been disclosed, as a method for endowing a lithium-titanium complex oxide with electric conductivity, doping a crystal lattice of a lithium-titanium complex oxide with dissimilar metal, for example, doping lithium titanate with an element having a higher valence than Ti(IV) (V, Nb, Mo, P) (Patent Reference No. 1), and disclosed an active material for a battery wherein transition metal (V, Zr, Nb, Mo, Mn, Fe, Cu, Co) is doped (Patent Reference No. 2). There has been disclosed as a method for coating an active material surface with an electroconductive substance such as carbon, a metal and an oxide, an active material for a battery wherein the surfaces of lithium titanate particles are coated with carbon at a particular ratio (Patent Reference No. 3).

In an electrode reaction, whereas oxidation and reduction of electrodes proceed by discharge and storage of lithium ions and transfer of electrons in the course of charge or discharge, an electrode reaction rate, that is, an output property, depend on a dispersion rate of lithium ions and electron mobility within the solid phase of an active material. The disclosed method for endowing a less electroconductive lithium-titanium complex oxide with electroconductivity fails to adequate electroconductivity due to the absence of a highly conductive substance within the particle and thus a load resistance due to electron transfer is not satisfactorily reduced. In a method wherein the surfaces of particles are coated with carbon by thermal decomposition of an organic compound, the carbon exhibits poor graphite crystallinity and thus poor electroconductivity, and in the coated area, the active material surface is not directly in contact with an electrolyte, and thus spreading diffusion of lithium ions are prevented, which is disadvantageous to, for example, output properties and a utilization rate of an active material.

PRIOR ART REFERENCES

Patent References

Patent Reference No. 1: Japanese patent publication No. 3625680.
Patent Reference No. 2: Japanese Laid-Open Patent Publication No. 2009-542562.
Patent Reference No. 3: Japanese Laid-Open Patent Publication No. 2009-238656.

Non-Patent References

Non-patent Reference No. 1: D. Peramunage, J. Electrochem. Soc. 145(1998), 2609.

SUMMARY OF INVENTION

Problem to be Solved by the Invention

To solve the above problems, an objective of the present invention is to provide an electrode material for a secondary battery wherein a network conductive circuit made of a highly electro conductive substance is formed in the inside and the surface of lithium-titanium complex oxide particles to facilitate transfer of electrons and lithium ions, to reduce a load property and to improve an output property and a battery life.

Means for Solving Problem

A network electro conductive circuit is formed in the inside and the surface of lithium-titanium complex oxide particles by compositing a lithium-titanium complex oxide with a fine graphite carbon fiber having higher electron conductivity and a nanosized outer diameter. The fine carbon fiber attached to the particle surface as a network does not cover the entire surface of the particles, thus a battery electrolyte is directly in contact with the particle surface, resulting in facilitating transfer of electrons and lithium ions. Specifically, the present invention relates to the following items.

[1] An electrode material for a secondary battery wherein the inside and the surface of a lithium-titanium complex oxide is composited with a fine carbon fiber as a network.

[2] The electrode material for a secondary battery as described in [1], wherein said lithium-titanium complex oxide comprises spinel-type $Li_4Ti_5O_{12}$ as a main component and has an average particle size of 50 nm or more and less than 1000 nm and a specific surface area of 1 $m^2$/g or more and 30 $m^2$/g or less.

The electrode material as described in [1] or [2], wherein the content of said fine carbon fiber is 0.1% by weight or more, 10% by weight or less based on the total weight.

[4] The electrode material as described in any one of [1] to [3], wherein a volume resistivity is less than $10^5$ $\Omega \cdot cm$ under the pressure of 10 $MPa/cm^2$.

[5] The electrode material for a secondary battery as described in any one of [1] to [4], wherein the fine carbon fiber is produced by vapor phase growth in which a graphite-net plane forms a structural unit comprising closed head-top part and body-part with open lower-end, 2 to 30 of the structural units are stacked sharing a common central axis to form an aggregate, and the aggregates are connected in head-to-tail style with a distance to form the fiber.

[6] The electrode material as described in any one of [1] to [5], wherein in said fine carbon fiber, graphite AB planes (graphite basal planes) are aligned at an angle of less than 15° to a fiber-axis direction.

[7] The electrode material as described in any one of [1] to [6], wherein in the fine carbon fiber, an end of the body-part of the aggregate has an outer diameter D of 5 to 40 nm and an inner diameter d of 3 to 30 nm, and an aspect ratio (L/D) of the aggregate is 2 to 150.

[8] The electrode material as described in any one of [1] to [7], wherein the fine carbon fiber is produced by vapor phase growth using a catalyst containing an element selected from the group consisting of Fe, Co, Ni, Al, Mg and Si, and an ash content in the fine carbon fiber is 4% by weight or less.

[9] The electrode material as described in any one of [1] to [8], wherein the fine carbon fiber is produced by the method comprising feeding a mixed gas containing CO and $H_2$ onto a catalyst containing a spinel-type oxide of cobalt, in which magnesium is contained by substitution forming solid solution, to initiate a reaction and growing the fine carbon fiber.

The electrode material as described in [9], wherein when the spinel-type oxide of cobalt, in which magnesium is contained by substitution forming solid solution is represented by $Mg_xCo_{3-x}O_y$, "x" which is a solid solution range of magnesium is 0.5 to 1.5.

[11] A process for manufacturing an electrode material for a secondary battery, comprising:
(Step a-1) kneading a fine carbon fiber agglomerate and a titanium compound under shear force to provide a mixture of the opened fine carbon fiber and the titanium compound,
(Step a-2) mixing the mixture obtained in Step a-1 and a lithium compound, and
(Step a-3) calcining the mixture obtained in Step a-2 under an inert atmosphere.

[12] A process for manufacturing an electrode material for a secondary battery, comprising:
(Step b-1) kneading a fine carbon fiber agglomerate, a titanium compound and a lithium compound under shearing force to provide a mixture of the opened fine carbon fiber, the titanium compound and the lithium compound, and
(Step b-2) calcining the mixture obtained in Step b-1 under an inert atmosphere.

[13] A process for manufacturing an electrode material for a secondary battery, comprising:
(Step c-1) opening and dispersing a fine carbon fiber agglomerate in a dispersion medium using a dispersant,
(Step c-2) blending the dispersion of the opened fine carbon fiber obtained in Step c-1, a titanium compound and a lithium compound, and (Step c-3) calcining the mixture obtained in Step c-2 under an inert atmosphere.

[14] A process for manufacturing an electrode material for a secondary battery, comprising:
(Step d-1) opening and dispersing/blending a fine carbon fiber agglomerate in a mixture of a dispersion medium, a titanium compound and a lithium compound using a dispersant, and
(Step d-2) calcining the mixture obtained in Step d-1 under an inert atmosphere.

[15] The manufacturing process as described in any one of [11] to [14], wherein the titanium compound is titanium dioxide particles and/or titanium hydroxide particles with a size of 20 nm or more and less than 500 nm, and the lithium compound is lithium carbonate and/or lithium hydroxide.

[16] The manufacturing process as described in [15], wherein the titanium dioxide is anatase-type or rutile-type titanium oxide.

[17] The manufacturing process as described in [15], wherein said titanium hydroxide is metatitanic acid or orthotitanic acid.

[18] The manufacturing process as described in any one of [11] to [17], wherein the fine carbon fiber agglomerate is produced by vapor phase growth in which a graphite-net plane of a fine carbon fiber constituting the agglomerate forms a structural unit comprising closed head-top part and body-part with open lower-end, 2 to 30 of the structural units are stacked sharing a common central axis to form an aggregate, and the aggregates are connected in head-to-tail style with a distance to form the fiber.

[19] The manufacturing process as described in any one of [13] to [18], wherein the dispersant is carboxymethylcellulose or polyvinylpyrrolidone.

[20] The manufacturing process as described in any one of [13] to [19], wherein said dispersion medium comprises a polar organic solvent.

[21] The manufacturing process as described in any one of [11] to [20], wherein the calcining is conducted at a temperature of 550° C. or more and less than 950° C.

Effect of the Invention

In accordance with the present invention, there can be provided a lithium secondary battery, in which electron conductivity of electrode material of a lithium-titanium complex oxide used for a cathode or anode and mobility of lithium ions can be improved, deterioration in cycle properties is reduced and discharge properties under high load is excellent.

MODE FOR CARRYING OUT THE INVENTION

<Lithium-Titanium Complex Oxide Composited with a Fine Carbon Fiber>

The present invention is characterized in that the surface and the inside of a lithium-titanium complex oxide are composited with a fine carbon fiber as a network. In accordance with the present invention, a fine carbon fiber as a highly-conductive substance is present in the surface and the inside of a lithium-titanium complex oxide, resulting in high electroconductivity. Furthermore, since the fine carbon fiber is composited as a network, the surface of the lithium-titanium complex oxide can be directly in contact with an electrolyte, facilitating diffusion of lithium ions, which allows for a high output property as an electrode material.

An average particle size of a lithium-titanium complex oxide composited with a fine carbon fiber according to the present invention is preferably 50 nm or more and less than 1000 nm, more preferably 50 nm or more and 800 nm or less. A specific surface area is preferably 1 $m^2/g$ or more and 30 $m^2/g$ or less, more preferably 2.5 $m^2/g$ or more and 30 $m^2/g$ or less.

A lithium-titanium complex oxide in the present invention and the structure of a fine carbon fiber composited therewith will be described later. The amount of the composited fine carbon fiber is preferably 0.1% by weight or more and 10% by weight or less, more preferably 0.5% by weight or more and 7% by weight or less, further preferably 0.75% by weight or more and 5% by weight or less based on the total weight. While a low content of the fine carbon fiber is not influential, 0.1% by weight or more is preferable because an electric conductivity can be effectively improved. On the other hand, an excessively large content of the fine carbon fiber causes significant reduction in a capacitance of an electrode material, which affects battery performance.

Preferably, a lithium-titanium complex oxide composited with a fine carbon fiber according to the present invention has, for example, a volume resistivity of less than $10^5$ Ω·cm under a pressure of 10 MPa/$cm^2$.

<Manufacturing Process for a Lithium-Titanium Complex Oxide Composited with a Fine Carbon Fiber>

A lithium-titanium complex oxide composited with the above fine carbon fiber can be produced by, for example, any of the aspects below.

The first aspect comprises:
(Step a-1) kneading a fine carbon fiber agglomerate and a titanium compound under shear force to provide a mixture of the opened fine carbon fiber and the titanium compound,
(Step a-2) mixing the mixture obtained in Step a-1 and a lithium compound, and
(Step a-3) calcining the mixture obtained in Step a-2 under an inert atmosphere.

The second aspect comprises:
(Step b-1) kneading a fine carbon fiber agglomerate, a titanium compound and a lithium compound under shear force to provide a mixture of the opened fine carbon fiber, the titanium compound and the lithium compound, and
(Step b-2) calcining the mixture obtained in Step b-1 under an inert atmosphere.

The third aspect comprises:
(Step c-1) opening and dispersing a fine carbon fiber agglomerate in a dispersion medium using a dispersant,
(Step c-2) blending the dispersion of the opened fine carbon fiber obtained in Step c-1, a titanium compound and a lithium compound, and
(Step c-3) calcining the mixture obtained in Step c-2 under an inert atmosphere.

The fourth aspect comprises:
(Step d-1) opening and dispersing/blending a fine carbon fiber agglomerate in a mixture of a dispersion medium, a titanium compound and a lithium compound using a dispersant, and
(Step d-2) calcining the mixture obtained in Step d-1 under an inert atmosphere.

Here, there will be first described a fine carbon fiber, a titanium compound and a lithium compound used in producing a lithium-titanium complex oxide composited with a fine carbon fiber according to the present invention.

<Structure of a Fine Carbon Fiber>

A fine carbon fiber constituting an agglomerate of a fine carbon fiber used in the present invention is preferably, but not limited to, a fine carbon fiber having a single- or multi-layered graphite layer which deposits and grows by arc discharge of a carbon electrode or pyrolysis of a gaseous carbon-containing compound over a floating or fixed catalyst heated at 500° C. or higher, which has an outer diameter of 100 nm or less and an aspect ratio of 3 or more. As a fine carbon fiber, there have been reported substantially four categories of nanostructured carbon materials in the light of a shape, a type and a structure.
(i) Multilayer carbon nanotube (multilayer concentric cylindrical graphite layer)(non-fishbone type);
Japanese publication of examined application Nos. H03-64606 and H03-77288 (Hyperion Catalysis International Inc.)
Japanese Laid-Open publication No. 2004-299986 (Mitsubishi Materials Corporation)
(ii) Cup stack type carbon nanotube (fishbone type);
U.S. Pat. No. 4,855,091 (Method for the preparation of carbon filaments) M. Endo, Y. A. Kime etc.: Appl. Phys. Lett., vol 80 (2002) 1267 et seq.
Japanese Laid-Open publication No. 2003-073928 (GSI Creos Corporation)
Japanese Laid-Open publication No. 2004-360099 (Mitsubishi Chemical Corporation)

(iii) Node-type carbon nanofiber (non-fishbone structure)

J. P. Pinheiro, P. Gadelle etc.: Carbon, 41 (2003) 2949-2959

P. E. Nolan, M. J. Schabel, D. C. Lynch Carbon, 33[1] (1995) 79-85

(iv) Platelet type carbon nanofiber (card type)

H. Murayama, T. maeda,: Nature, vol 345 [No. 28] (1990) 791 to 793

Japanese Laid-Open publication No. 2004-300631(Mitsubishi Materials Corporation)

Figure 1:
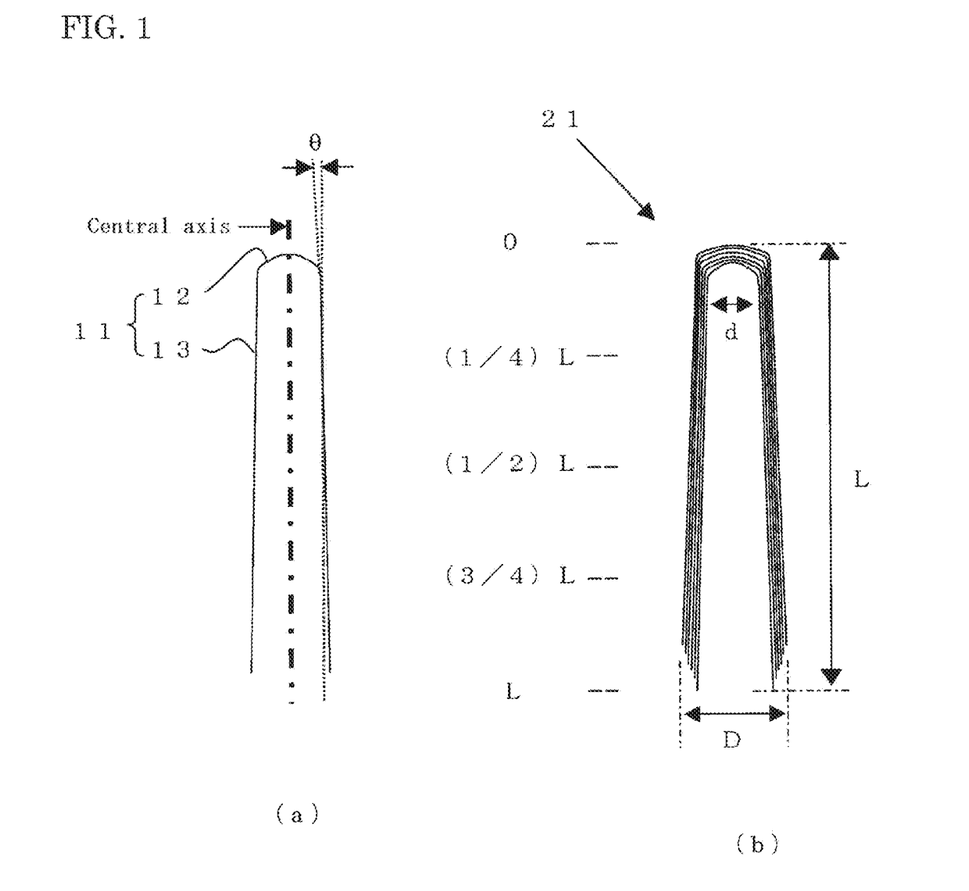
FIG. 1(a) is a drawing schematically showing a minimal structural unit (temple-bell-shaped structural unit) constituting a fine carbon fiber.
FIG. 1(b) is a drawing schematically showing an aggregate consisting of 2 to 30 stacked temple-bell-shaped structural units.
Figure 3:
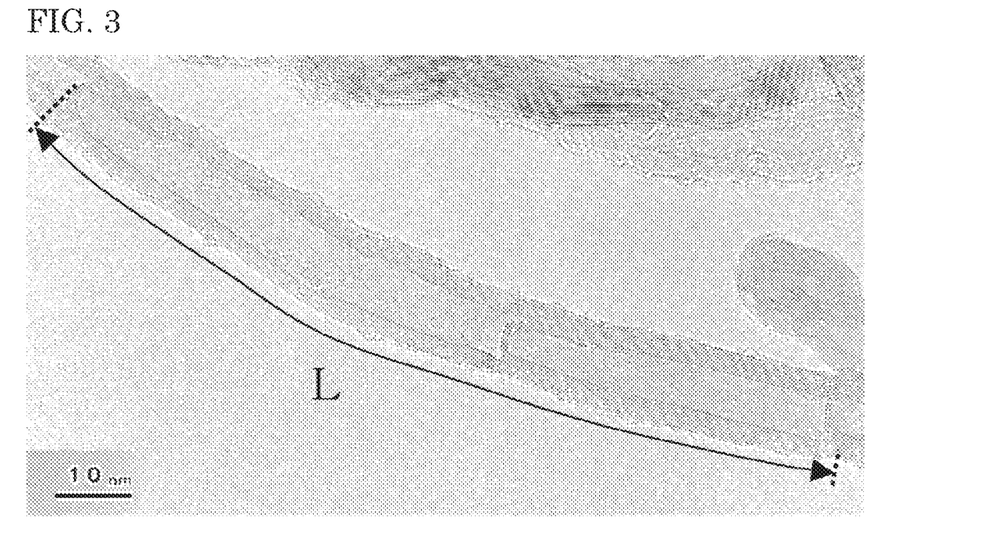
FIG. 3 is a TEM image of the fine carbon fiber produced in Reference Example.

In addition to the above carbon fiber having a nanostructure, a fine carbon fiber having the following structural features can be used in the present invention. The fine carbon fiber has a temple-bell-shaped structure as shown in FIG. 1(a) as a minimal structural unit. A temple bell is commonly found in Japanese temples, which has a relatively cylindrical-shaped body-part, which is different from a Christmas bell that is very close to cone-shape. As shown in FIG. 1(a), a structural unit 11 has a head-top part 12 and a body-part 13 having an open end like a temple bell and approximately has a shape as a body of rotation formed by rotation about a central axis. The structural unit 11 is constituted by a graphite-net plane consisting solely of carbon atoms, and the circumference of the open-end of the body-part is the open end of the graphite-net plane. Here, although the central axis and the body-part 13 are, for convenience, indicated by a straight line in FIG. 1(a), they are not necessarily straight, but may be curved as shown in FIG. 3 described later.

The body-part 13 is gradually enlarged toward the open-end side, and as a result, the generatrix of the body-part 13 is slightly oblique to the central axis of the temple-bell-shaped structural unit and an angle formed $\theta$ by these is less than $15°$, more preferably $1°<\theta<15°$, further preferably $2°<\theta<10°$. With an excessively large $\theta$, a fine fiber constituting from the structural units has a structure like a fish bone carbon fiber, leading to deterioration in electro conductivity in a fiber axis direction. On the other hand, with a smaller $\theta$, it has a structure like a cylindrical tube and thus the open end of the graphite-net plane constituting the body-part in the structural unit are less exposed in the outer circumference surface of the fiber, leading to deterioration in conductivity between adjacent fibers.

The fine carbon fiber has defects and irregular disturbances, but when their shape is observed as a whole neglecting such irregularity, it can be the that they have a temple-bell-shaped structure where the body-part 13 is gradually enlarged toward the open end side. In terms of a fine carbon fiber, the above description does not mean that $\theta$ is within the above range in all parts, but means that when the structural unit 11 is observed as a whole neglecting defects and irregular parts, $\theta$ generally is within the above range. Therefore, in determination of $\theta$, it is preferable to eliminate an area near the head-top part 12 where a thickness of the body-part irregularly varies. More specifically, for example, when a length of a temple-bell-shaped structural unit aggregate 21 (see, the description below) is "L" as shown in FIG. 1(b), $\theta$ may be measured at three points $(¼)L$, $(½)L$ and $(¾)L$ from the head-top part side and an average of the measured values is determined and the average may be regarded as $\theta$ for the whole structural unit 11. "L" is ideally measured in a straight line, but actually, the body-part 13 is often curved, and therefore, it can be measured along the curve in the body-part 13 to give a substantially more real value.

When produced as a fine carbon fiber, the head-top part has a shape which is smoothly connected to the body-part and convexly curved to the upper side (in the figure). A length of the head-top part is typically about "D" (see FIG. 1(b)) or less, sometimes about "d" (see FIG. 1(b)) or less, wherein "D" and "d" will be described for a temple-bell-shaped structural unit aggregate.

Furthermore, as described later, active nitrogen is not used as a starting material, so that other atoms such as nitrogen are not contained in the graphite-net plane of the temple-bell-shaped structural unit. Thus, the fiber exhibits excellent crystallinity.

In a fine carbon fiber, as shown in FIG. 1(b), 2 to 30 of such temple-bell-shaped structural units are stacked sharing a central axis, to form a temple-bell-shaped structural unit aggregate 21. The stack number is preferably 2 to 25, more preferably 2 to 15.

An outer diameter "D" of the body-part of the temple-bell-shaped structural unit aggregate 21 is 5 to 40 nm, preferably 5 to 30 nm, further preferably 5 to 20 nm. A diameter of a fine fiber increases as "D" increases, so that in complexing with a lithium-titanium complex oxide, a large amount needs to be added for giving particular functions such as electro conductivity. On the other hand, as "D" decreases, a diameter of a fine fiber decreases, so that fibers tend to more strongly agglomerate each other, leading to difficulty in dispersing and complexing them in preparation of a complex. A body-part outer diameter "D" is determined preferably by measuring it at three points $(¼)L$, $(½)L$ and $(¾)L$ from the head-top part of the aggregate and calculating an average. Although FIG. 1(b) shows a body-part outer diameter "D" for convenience sake, an actual "D" is preferably an average of the measured values at the above three points.

An inner diameter "d" of the body-part of the aggregate is 3 to 30 nm, preferably 3 to 20 nm, further preferably 3 to 10 nm. Again, a body-part inner diameter "d" is determined preferably by measuring it at three points $(¼)L$, $(½)L$ and $(¾)L$ from the head-top part of the temple-bell-shaped structural unit aggregate and calculating an average. Although FIG. 1(b) shows a body-part inner diameter "d" for convenience sake, an actual "d" is preferably an average of the measured values at the above three points.

An aspect ratio (L/D) calculated from a length "L" of the aggregate 21 and a body-part outer diameter "D" is 2 to 150, preferably 2 to 50, further preferably 2 to 20. With a larger aspect ratio, a fiber formed has a structure of a more cylindrical tube and conductivity in a fiber axis direction in a single fiber is improved, but the open ends of the graphite-net planes constituting the body-part of the structural units are less frequently exposed in the circumferential surface of the fiber, leading to deterioration in conductivity between adjacent fibers. On the other hand, with a smaller aspect ratio, the open ends of the graphite-net planes constituting the body-part of the structural units are more frequently exposed in the circumferential surface of the fiber, so that conductivity between adjacent fibers can be improved, but a fiber circumferential surface is constituted by a number of connected short graphite-net planes in a fiber axis direction, leading to deterioration in conductivity in a fiber axis direction in a single fiber.

Figure 2:
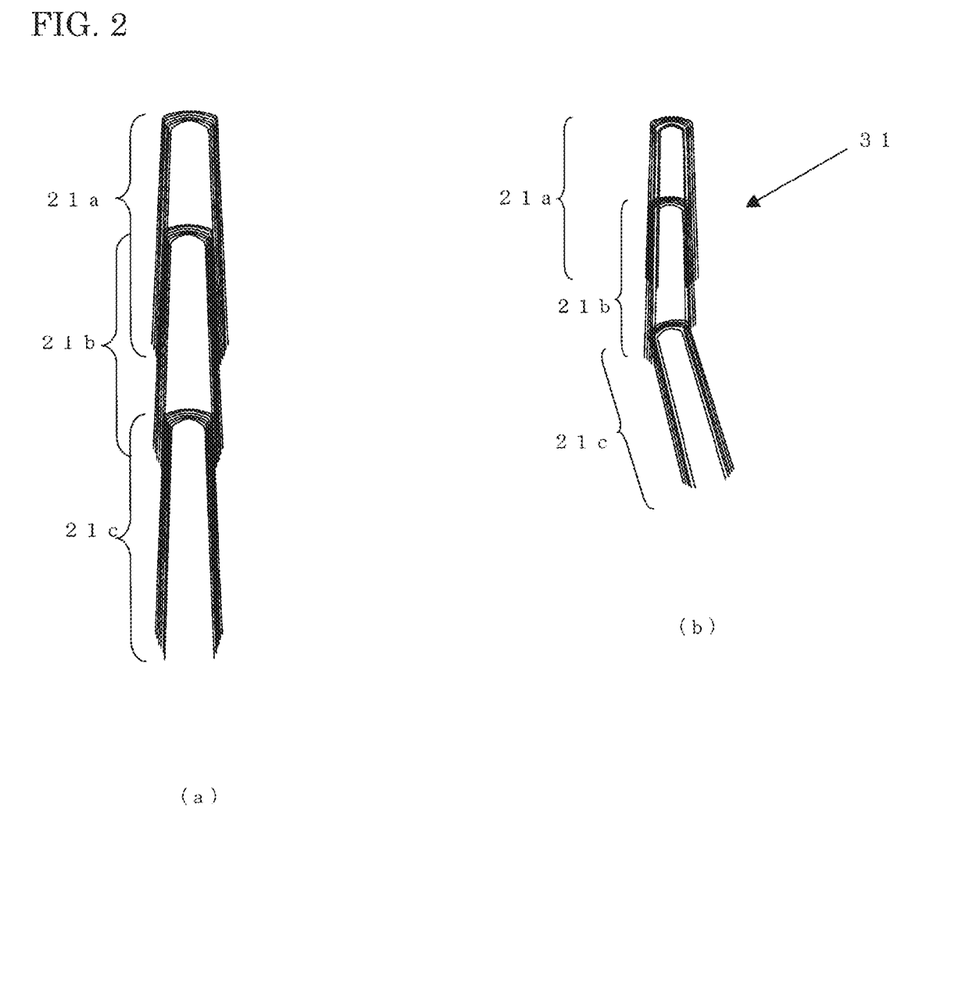
FIG. 2(a) is a drawing schematically showing connecting aggregates with a certain distance to form a fiber.
FIG. 2(b) is a drawing schematically showing curved connection when aggregates are connected with a certain distance.

First, the fine carbon fiber is formed by connecting the aggregates in a head-to-tail style as shown in FIG. 2(a). A head-to-tail style means that in a configuration of the fine carbon fiber, a bonding site between adjacent aggregates is formed from a combination of the head-top part (head) of one aggregate and the lower end (tail) of the other aggregate. As a specific style of bonding the part, the head-top part of the outermost temple-bell-shaped structural unit in the second temple-bell-shaped structural unit aggregate 21b is inserted into the inner part of the innermost temple-bell-shaped structural unit at a lower opening of a first temple-bell-shaped structural unit aggregate 21a; and furthermore, the head-top part of a third temple-bell-shaped structural unit aggregate 21c is inserted into the lower opening of a second temple-bell-shaped structural unit aggregate 21b, and a number of such combinations are serially connected to form a fiber. Shear stress is applied to the fine carbon fiber, to cause sliding between graphite fundamental planes at a bonding part in the temple-bell-shaped structural unit aggregate, so that the fine carbon fiber is shortened. The fine short carbon fiber formed by such fiber partially shortening is as short as a fiber length of several to about several ten temple-bell-shaped structural unit aggregates, preferably 10 to 50 aggregates which are connected. An aspect ratio of the fine carbon fiber is about 5 to 200. An aspect ratio is further preferably 10 to 50. Even when shear stress is applied, cleavage does not occur in a fiber straight body-part of the fiber consisting of carbon SP2 bonds in the aggregate, so that the fiber is not cut into a unit smaller than an temple-bell-shaped structural unit aggregate.

Each bonding part forming one fine fiber of the fine carbon fibers does not have structural regularity; for example, a length of a bonding part between a first temple-bell-shaped structural unit aggregate and a second temple-bell-shaped structural unit aggregate in a fiber axis direction is not necessarily equal to a length of a bonding part between the second temple-bell-shaped structural unit aggregate and a third temple-bell-shaped structural unit aggregate. Furthermore, as shown in FIG. 2(a), two temple-bell-shaped structural unit aggregates bonded share a common central axis and may be connected in a straight line, but as in the temple-bell-shaped structural unit aggregates 21b and 21c shown in FIG. 2(b), they may be bonded without sharing a central axis, resulting in a curved structure in the bonding part. A length "L" of the temple-bell-shaped structural unit aggregate is approximately constant in each fiber. However, since in vapor phase growth, starting materials and byproduct gaseous components and a catalyst and a solid product component exist in mixture, a temperature distribution may occur in a reaction vessel; for example, a local site at a temporarily higher temperature generates depending on a flowing state of the above heterogeneous reaction mixture of a gas and a solid during an exothermic carbon precipitating reaction, possibly resulting in variation in a length "L" to some extent.

In XRD of a fine carbon fiber, a peak half width W (unit: degree) of 002 plane measured is within the range of 2 to 4. If W is more than 4, graphite exhibits poor crystallinity and poor conductivity. On the other hand, if W is less than 2, graphite exhibits good crystallinity, but at the same time, fiber diameter becomes large, so that a larger amount is required for giving electro conductivity to a lithium-titanium complex oxide.

A graphite plane gap d002 as determined by XRD of a fine carbon fiber is 0.350 nm or less, preferably 0.341 to 0.348 nm. If d002 is more than 0.350 nm, graphite crystallinity is deteriorated and conductivity is reduced. On the other hand, if d002 is less than 0.341 nm, a fine carbon fiber is produced in a low yield in the production.

The ash content contained in the fine carbon fiber is 4% by weight or less, and therefore, purification is not necessary for a common application. Generally, it is 0.3% by weight or more and 1.5% by weight or less, more preferably 0.3% by weight or more and 1% by weight or less. The ash content is determined from a weight of an oxide as a residue after combustion of 0.1 g or more of a fiber.

Immediately after production by a vapor-phase growth method described below, a fine carbon fiber having the above features forms a complicatedly entangled massive agglomerate with a size of several ten µm to several mm.

A fine carbon fiber having the above features can be easily divided at its joints by applying a stress as described in WO 2009/110570. Likewise, in the present invention, when an agglomerate of a fine carbon fiber is kneaded with a titanium compound, or when an agglomerate of a fine carbon fiber is mixed under stirring with a dispersant in a dispersion medium, the titanium dioxide particles enter the fine carbon agglomerate and a shear force is applied to the agglomerate of the fine carbon fiber as described later. Thus, since in the aggregate of the structural units, the units are combined at joints in mutually adjacent graphite basal planes, application of a stress parallel to a fiber axis easily causes sliding between graphite base planes, so that the aggregate of the structural units are partially divided in such a manner that the units are pulled out from each other. Here, since the structural unit aggregate has a structure joined by van der Waals force, a relatively small energy is sufficient to divide the units at joints, and the resulting fine carbon fibers are not damaged at all.

Therefore, when a fine carbon fiber having the above features is used, an agglomerate can be efficiently opened and dispersed with fiber breakage being prevented as much as possible. In terms of the inside of a fine carbon fiber, in a joint of some aggregates of bell-shaped structural units, a graphite network plane in the area in the joint where separation between structural units has occurred is exposed to the circumference face of the fiber and the end face of the graphite layer exists as a more active part. As a result, the fine carbon fiber adheres to the surface of titanium particles, to provide solid particles whose surface is covered by the fine carbon fiber.

Figure 4:
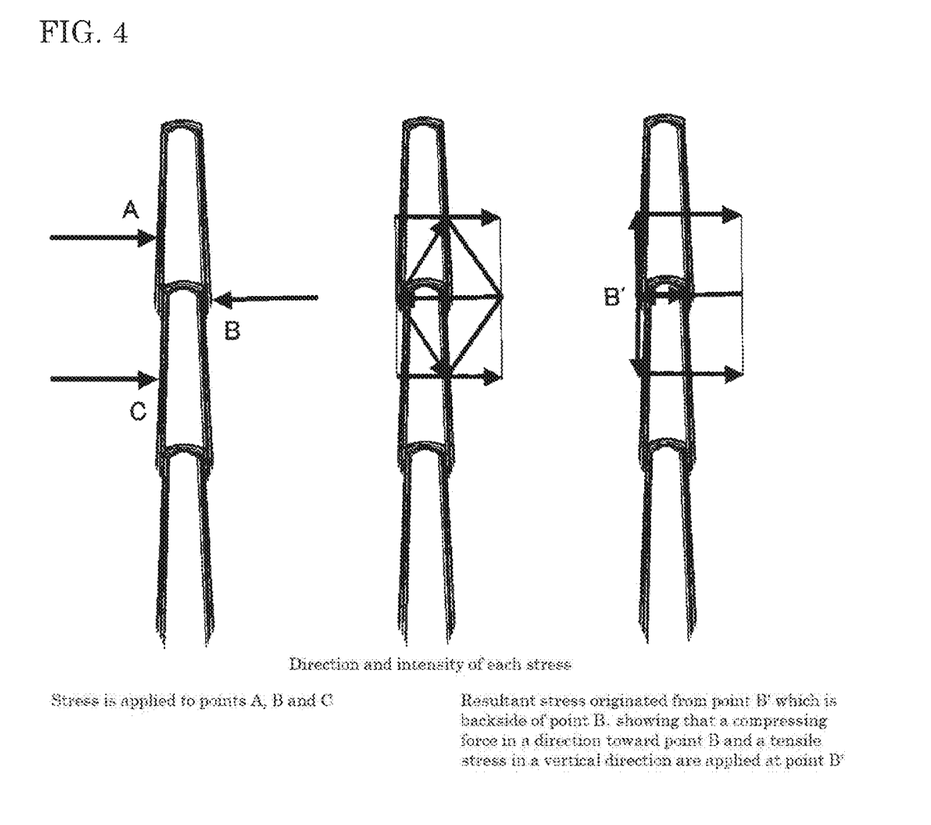
FIG. 4 illustrates conversion of a shear force into a tensile stress at a middle point when a shear force is laterally applied to a fine carbon fiber.

FIG. 4 shows the state where a shear force by kneading is applied to a fine carbon fiber. In this figure, the force applied to points A, B and C acts as a compressing force perpendicular to the fiber-axis direction with point B' being a fulcrum and a tensile force parallel to the fiber-axis direction. The tensile force acts on a joint in an aggregate of structural units where tensile strength is lowest in the fiber of the present invention, that is, sliding tends to occur between graphite AB planes (between graphite basal planes), and the fiber is divided/broken at this part.

<Manufacturing Process for a Fine Carbon Fiber>

Although a fine carbon fiber can be produced by a known process such as arc discharge, vapor-phase growth, laser irradiation and a template method, it is preferably produced by a vapor-phase growth method using a catalyst. Preferred catalyst comprises an element selected from the group consisting of Fe, Co, Ni, Al, Mg and Si, and the preferred feed gas is a mixed gas containing CO and $H_2$. Most preferably, using a catalyst which is an oxide of cobalt having a spinel type crystal structure containing magnesium by substitution forming solid solution, vapor phase growth is conducted supplying a mixed gas containing CO and $H_2$ to the catalyst particles to produce a fine carbon fiber. The following explains an example of a process for manufacturing the fine carbon fiber having the temple-bell-shaped structure by vapor phase growth.

The fine carbon fiber having the temple-bell-shaped structural unit is produced by vapor phase growth, using a catalyst which is an oxide of cobalt having a spinel type crystal structure containing magnesium by substitution forming solid solution, in which supplying a mixed gas containing CO and $H_2$ to the catalyst particles.

A spinel type crystal structure of cobalt where Mg is substituted forming solid solution is represented by $Mg_xCo_{3-x}O_y$. In this formula, x is a number indicating substitution of Co by Mg, and nominally, $0<x<3$. Furthermore, y is a number selected such that electric charge of the whole formula becomes neutral, and is formally a number of 4 or less. That is, a spinel-type oxide of cobalt $Co_3O_4$ contains divalent and trivalent Co ions, and when divalent and trivalent cobalt ions are represented by $Co^{II}$ and $Co^{III}$, respectively, a cobalt oxide having a spinel type crystal structure is represented by $Co^{II}Co^{III}_2O_4$. Both sites of $Co^{II}$ and $Co^{III}$ are substituted by Mg to form a solid solution. After the solid solution formation by substitution with Mg for Com, electric charge is kept to be neutral and thus y is less than 4, However, both x and y have a value within a range that a spinel type crystal structure can be maintained.

For the use as a catalyst, a solid solution range of Mg represented by x is preferably 0.5 to 1.5, more preferably 0.7 to 1.5. A solid solution amount as x of less than 0.5 results in poor catalyst activity, leading to production of a fine carbon fiber in a lower yield. If x is more than 1.5, it is difficult to produce a spinel type crystal structure.

A spinel-type oxide crystal structure of the catalyst can be confirmed by XRD, and a crystal lattice constant "a" (cubic system) is within the range of 0.811 to 0.818 nm, more preferably 0.812 to 0.818 nm. If "a" is small, substitutional solid solution formation with Mg is inadequate and catalyst activity is low. The above spinel-type oxide crystal having a lattice constant larger than 0.818 nm is difficult to produce.

We suppose that such a catalyst is suitable because solid solution formation by substitution with magnesium in the spinel structure oxide of cobalt provides a crystal structure as if cobalt is dispersedly placed in magnesium matrix, so that under the reaction conditions, aggregation of cobalt is inhibited.

A particle size of the catalyst can be selected as appropriate and for example, is 0.1 to 100 μm, preferably 0.1 to 10 μm as a median diameter.

Catalyst particles are generally placed on an appropriate support such as a substrate or a catalyst bed by an appropriate application method such as spraying, for use. Spraying catalyst particles on a substrate or catalyst bed can be conducted by directly spraying the catalyst particles or spraying a suspension of the particles in a solvent such as ethanol and then drying it to spray a desired amount.

It is also preferable that catalyst particles are activated before being reacted with a source gas. Activation is generally conducted by heating under a gas atmosphere containing $H_2$ or CO. Such activation can be conducted by diluting the above gas with an inert gas such as He and $N_2$ as necessary. A temperature at which activation is conducted is preferably 400 to 600° C., more preferably 450 to 550° C.

There are no particular restrictions to a reactor for vapor phase growth, which can be conducted using a reactor such as a fixed-bed reactor and a fluidized-bed reactor.

A mixed gas containing CO and $H_2$ is used as a source gas to be a carbon source in vapor-phase growth.

An addition concentration of $H_2$ gas $\{(H_2/(H_2+CO)\}$ is preferably 0.1 to 30 vol %, more preferably 2 to 20 vol %. When the addition concentration is too low, cylindrical graphite net planes form a carbon-nanotube-like structure parallel to a fiber axis. On the other hand, if it is more than 30 vol %, the angle of the temple-bell-shaped structure oblique to the fiber axis of a carbon side peripheral surface becomes larger and similar to a fish-bone shape, leading to lower conductivity in a fiber direction.

A reaction temperature for conducting vapor-phase growth is preferably 400 to 650° C., more preferably 500 to 600° C. If a reaction temperature is too low, a fiber does not grow. On the other hand, if a reaction temperature is too high, an yield is reduced. A reaction time is, but not limited to, for example, 2 hours or more and about 12 hours or less.

In terms of a reaction pressure, vapor-phase growth can be conducted at an ambient pressure from the viewpoint of convenience of a reactor or operation, but as long as carbon growth of Boudouard equilibrium proceeds, the reaction can be conducted under the pressurized or reduced-pressure condition.

It has been demonstrated that according to this manufacturing process for a fine carbon fiber, a yield of a fine carbon fiber per a unit weight of the catalyst is considerably higher than that in a conventional manufacturing process. A yield of a fine carbon fiber according to this manufacturing process for a fine carbon fiber is 40 folds or more, for example 40 to 200 folds per a unit weight of the catalyst. As a result, a fine carbon fiber containing reduced amount of impurities and ash content as described above can be produced.

Although a process of forming the bonding part unique to the fine carbon fiber prepared by this manufacturing process for a fine carbon fiber is not clearly understood, it is speculated that balance between exothermic Boudouard equilibrium and heat removal by source-gas flowing causes variation of a temperature near the fine cobalt particles formed from the catalyst, so that carbon growth intermittently proceeds, resulting in formation of the bonding part. In other words, it is speculated that four processes: [1] formation of a head-top part of a temple-bell-shaped structure, [2] growth of a body-part in the temple-bell-shaped structure, [3] pause of growth due to temperature increase caused by the processes [1] and [2], and [4] cooling by a flowing gas, are repeated on fine catalyst particles, to form the bonding part unique to a fine carbon fiber structure.

<Titanium Compound>

A titanium compound used in the present invention is preferably titanium dioxide and/or titanium hydroxide.

Titanium dioxide can include an anatase-type crystal, rutile-type crystal or amorphous structure, preferably an anatase-type crystal or amorphous structure. Titanium dioxide can be produced by dehydrating and calcining titanium hydroxide. Furthermore, increase in the amount of impurities leads to a lower capacitance per a unit weight when it is used as an electrode material, and therefore, titanium dioxide preferably has a purity of 98% by weight or more.

Titanium hydroxide can include metatitanic acid represented by $TiO(OH)_2(TiO_2.H_2O)$, orthotitanic acid represented by $Ti(OH)_4(TiO_2.2H_2O)$ and a mixture thereof. Titanium hydroxide can be produced by heating hydrolysis or neutralization hydrolysis of, for example, titanyl sulfate, titanium chloride or titanium alkoxide.

The titanium compound can suitably have a shape of, but not limited to, sphere or nearly-sphere (rod, spindle or polyhetral particles). The titanium compound preferably has a particle size of 20 nm or more and less than 500 nm. If the particle size is too small, since the particle size of the titanium compound is small relative to the size of the fine carbon fiber agglomerate, a shear force is insufficient and the opening of the agglomerate is less likely to proceed in (Step a-1) or (Step b-1) described above. Furthermore, if the particle size is too small, a slurry viscosity is so increased during preparing a slurry solution in (Step c-2) described above that it is difficult to prepare a high-concentration slurry. If the particle size is too large, a fine carbon fiber is not composited with a lithium titanate complex oxide, so that breakage tends to occur.

<Lithium Compound>

Examples of a lithium compound which can be used in the present invention include water-soluble lithium compound particles such as lithium hydroxide (LiOH, LiOH.H₂O), lithium carbonate and lithium nitrate and lithium sulfate.

There will be described the individual steps in a manufacturing process for a lithium-titanium complex oxide composited with a fine carbon fiber.

In (Step a-1) of the first aspect, particles of a titanium compound and a fine carbon fiber agglomerate are kneaded by applying a shear force. Thus, the fine carbon fiber agglomerate is opened, to provide titanium compound particles composited with the fine carbon fiber.

A weight ratio of the titanium compound to the fine carbon fiber agglomerate in the kneading is preferably 1000:1.15 to 10:1.15, particularly preferably 1000:8.6 to 20:1.15.

The kneading can be conducted in a solvent or neat. Examples of such a solvent include polar solvents such as water and alcohols; aromatic compounds such as xylenes and toluene; and aprotic polar solvents such as N-methyl-2-pyrrolidone and dimethyl sulfoxide. Examples of an apparatus which can be used for applying a shear force include, but not limited to, a mortar, a ball mill, a centrifugal ball mill, a planetary ball mill, a vibratory ball mill, an attritor type high-speed ball mill and a roll mill. A kneading time is preferably, but not limited to, 15 sec or more.

When the mixture of the opened fine carbon fiber and the titanium compound obtained in (Step a-1) above is mixed with a lithium compound in (Step a-2), they are preferably mixed such that a Li/Ti molar ratio is 0.75 or more and 0.88 or less. The reason why this molar ratio is preferable will be described later. The mixing can be conducted using, for example, a centrifugal planetary mill, a media mill or a roll mill.

In (Step a-3), the mixture obtained in (Step a-2) above is heated under an inert atmosphere such as nitrogen gas and argon gas for drying, dehydrating and calcining.

Here, there will be described the reaction in (Step a-3) with reference to an example using titanium dioxide and lithium hydroxide. First, at a temperature higher than about 470° C., that is, a melting point of LiOH, $Li_2TiO_3$ is formed in the surface of titanium dioxide particles (Equation (1)), $$2LiOH + TiO_2 \rightarrow Li_2TiO_3 + H_2O(g) \quad (1)$$

$Li_2TiO_3$ further reacts with $TiO_2$ present in the particle inside, leading to convert titanium dioxide $TiO_2$ into a lithium titanium complex $Li_4Ti_5O_{12}$ (Equation (2)).

$$2Li_2TiO_3 + 3TiO_2 \rightarrow Li_4Ti_5O_{12} \quad (2)$$

As described above, when titanium dioxide particles are converted into lithium-titanium complex oxide particles, the fine carbon fiber is incorporated into the particle inside as a network and/or covers the particle surface, resulting in compositing with the fine carbon fiber.

Here, in (Step a-2) above, the mixing is conducted such that a Li/Ti molar ratio in the mixture is 0.75 or more and 0.88 or less, resulting in accelerating generation of a lithium-titanium complex oxide containing a spinel structure $Li_4Ti_5O_{12}$ as a main component which exhibits excellent electrochemical properties. A too large Li/Ti molar ratio makes formation of $Li_2TiO_3$ prominent, while a too small ratio leads to a byproduct $Li_2Ti_3O_7$ and residual unreacted $TiO_2$.

A calcination temperature in (Step a-3) is preferably 550° C. or more and less than 950° C., more preferably 650° C. or more and 900° C. or less. A too low calcination temperature leads to incomplete conversion into a lithium-titanium complex oxide $Li_4Ti_5O_{12}$ having a spinel type structure in the reaction illustrated above, while a too high calcination temperature leads to generation of a different phase such as $Li_2Ti_3O_7$ having a ramsdellite type structure, causing reduction in a charge-discharge capacity and deterioration in load properties.

A calcination time is preferably 60 min or more and less than 300 min. A too short calcination time leads to incomplete convention of a starting material $TiO_2$, while a too long calcination time leads to excessive grain growth, forming coarse particles.

The calcination can be conducted by, for example, a method wherein a box sagger is charged with the mixture obtained in (Step a-2), which is then placed in a heater and is subjected to treatment such as drying, dehydration and calcination, or processing by a rotatory furnace. When a solvent is used in (Step a-1) or (Step a-2), spray drying can be conducted for removing the solvent, subsequently conducting charging a box sagger, dehydration and calcination as described above to provide a desired product.

In (Step b-1) of the second aspect, a fine carbon fiber agglomerate, a titanium compound and a lithium compound are kneaded by applying a shear force. Thus, the fine carbon fiber agglomerate is opened, and a mixture of the fine carbon fiber, the titanium compound and the lithium compound is obtained.

In (Step b-1), a weight ratio of the fine carbon fiber and the titanium compound in the kneading, and a molar ratio of the titanium compound and the lithium compound are as described for (Step a-1) and (Step a-2). A knead method is as described for (Step a-1). (Step b-2) is as described for (Step a-3).

In (Step c-1) of the third aspect, the fine carbon fiber agglomerate is opened and dispersed in a dispersion medium using a dispersant.

Examples of a dispersant include surfactants such as sodium oleate, polyoxyethylene carboxylate esters, monoalcohol esters and ferrocene derivatives; cyclic/polycyclic aromatic compounds such as pyrene compounds (pyrene ammonium), porphyrin compounds (ZnPP, Hemin, PPEt), polyfluorene, cyclic glucan, folic acid, lactam compounds (—CONH—) and lactone compounds (—CO—O—); linear conjugated polymers such as polythiophene, polyphenylene vinylene and polyphenylene ethylene; cyclic amides such as polyvinylpyrrolidone (PVP); polystyrene sulfonic acid; polymer micelle; water-soluble pyrene-containing polymers; saccharides such as fructose, polysaccharides (for example, carboxymethylcellulose) and amylose; inclusion complexes such as rotaxane; and cholic acid analogs, and in particular, carboxymethylcellulose and polyvinylpyrrolidone are suitable in case that the dispersion medium is aqueous. The amount of a dispersant is preferably ¹⁄₁₀₀ or more and ⁵⁰⁄₁₀₀ or less by weight based on the fine carbon fiber agglomerate.

The dispersion medium is usually, but not limited to, a polar solvent such as water and alcohols in the light of handling properties and solubility of a lithium compound.

The fine carbon fiber agglomerate is opened and dispersed by stirring a mixture of a dispersion medium, a dispersant, a fine carbon fiber agglomerate and so on using a homo mixer, Tri-mix or the like. For more effective opening/dispersion, ultrasound generated from oscillating shock wave, a bead mill utilizing impact by beads, balls or the like or shaking, or paint shaker is used.

In (Step c-1), the fine carbon fiber agglomerate can be oxidized before its dispersion. The oxidation makes the fine carbon fiber more compatible with a dispersion medium. Examples of an oxidation process include liquid phase oxidation using nitric acid/sulfuric acid, ozone, supercritical water, supercritical carbon dioxide or the like, atmospheric baking and hydrophilic treatment of a carbon fiber surface by, for example, gas-phase oxidation using oxygen plasma.

In (Step c-2), the dispersion of the opened fine carbon fiber obtained in (Step c-1) is mixed with a titanium compound and a lithium compound. In the mixing, as described for (Step a-2), the titanium compound and the lithium compound are preferably mixed in a Li/Ti molar ratio of 0.75 or more and 0.88 or less.

In (Step c-2), preferably the titanium compound is suspended in the lithium compound solution to prepare a slurry solution, which is then mixed with the dispersion of the fine carbon fiber obtained in (Step c-1). The slurry solution is preferably prepared by adding the material in a dispersion medium as used for opening and dispersion of the fine carbon fiber agglomerate in a weight ratio of 10 to 70%.

(Step c-3) is as described for (Step a-3).

In (Step d-1) of the fourth aspect, a fine carbon fiber agglomerate is opened and dispersed/blended in a mixture of a dispersion medium, a titanium compound and a lithium compound using a dispersant. Here, the dispersion medium, the dispersant, a dispersing method and the like employed are as described for (Step c-1). A preferable molar mixing ratio of the titanium compound to the lithium compound is as described for (Step c-2). Furthermore, (Step d-2) is as described for (Step a-3).

When a dispersant is used in an aspect other than those described above, at least a dispersion medium, a dispersant and a fine carbon fiber agglomerate can be involved for opening a fine carbon fiber agglomerate, and each of the other compounds such as titanium compound and lithium compound may be added during or after opening the fine carbon fiber agglomerate.

<Binding>

In a lithium-titanium complex oxide complexed with a fine carbon fiber according to the present invention, the fine carbon fiber can be fixed/bound using a binder. The fine carbon fiber can be bound to the inside or the surface of particles of a lithium-titanium complex oxide using, for example, a binder such as carbon and aqueous, non-aqueous or fluorine-containing binders. Examples of a method using carbon as a binder include a method using a carbon precursor and a CVD method.

In case that a binder is, for example, a carbon precursor, the carbon precursor as it is or as a solution in a solvent and a fine carbon fiber are kneaded for blending to open and disperse the fine carbon fiber, and then the mixture is heated under an inert gas atmosphere in (Step a-1), (Step b-1), (Step c-1) or (Step d-1). Thus, the precursor is converted into carbon to give solid particles in which the fine carbon fiber is dispersed in and bound to the particle surface via carbon. Examples of a carbon precursor which can be used include coal tar, coal-tar pitch, petroleum heavy oils, petroleum pitches, saccharides such as sucrose, polyalcohols, (water-soluble) phenol resins and furan resins.

In a CVD method using an organic solvent (alcohols such as ethanol, aromatic hydrocarbons such as toluene and so on) as a carbon source, the system can be heated simultaneously while being calcined in an inert atmosphere under a stream of an organic material gas vaporized and entrained with an inert gas in the calcination step of (Step a-3), (Step b-2), (Step c-3) or (Step d-2), thereby to give solid particles in which the fine carbon fiber is dispersed in and bound to the surface via the carbon.

Alternatively, after a calcined lithium-titanium complex oxide ($Li_4Ti_5O_{12}$ particles and so on) is obtained in (Step a-3), (Step b-2), (Step c-3) or (Step d-2), the CVD method as described above is conducted, to give solid particles in which the fine carbon fiber is dispersed in and bound to the surface via the carbon.

<Impurities in a Lithium-Titanium Complex Oxide>

A lithium-titanium complex oxide may be contaminated with impurities which are mainly impurities in titanium dioxide/titanium hydroxide as starting materials and contaminants from a heater. Impurities in titanium dioxide/titanium hydroxide are derived from ores and a production process (sulfuric acid method, chlorine method) including $Nb_2O_5$ (0.1 to 0.5 wt %), $SO_3$ (0.1 to 0.2 wt %), HCl (0.3 wt % or less), $P_2O_5$ (0.1 to 0.2 wt %), $K_2O$ (0.01 to 0.3 wt %), $Na_2O$ (0.005 to 0.3 wt %), Fe (0.01 wt %), $SiO_2$ (0.02 to 0.2 wt %), $Al_2O_3$ (0.3 wt %), MgO (0.005 wt %), Pb (40 ppm or less), ZnO (0.1 wt % or less), Cr (0.01 wt % or less), Ni (0.01 wt % or less) and the like, which do not affect an electrochemical reaction of a lithium-titanium complex oxide. Although they do not deteriorate properties as an electrode material, much impurities cause reduction in a capacitance per a unit weight, and therefore, a purity of $TiO_2$ is preferably 98% by weight or more.

<Lithium Secondary Battery>

In case that a lithium-titanium complex oxide of the present invention is used as an electrode material for a lithium secondary battery, the electrolyte contains a lithium compound as a solute expressing ion conductivity, and a solvent for dissolving and containing the solute can be used as long as it is not decomposed during charge/discharge or storage. Specific examples of a solute include $LiClO_4$, $LiPF_6$, $LiBF_4$, $LiCF_3SO_3$, $LiN(CF_3SO_2)_2$ and $LiC(CF_3SO_2)_3$. Examples of a solvent include cyclic carbonates such as ethylene carbonate (EC), propylene carbonate (PC) and vinylene carbonate (VC); linear carbonates such as dimethyl carbonate (DMC), methyl ethyl carbonate (MEC) and diethyl carbonate (DEC); cyclic ethers such as tetrahydrofuran (THF) and 2-methyltetrahydrofuran (2MeTHF); linear ethers such as dimethoxyethane (DME); γ-butyrolactone (BL), acetonitrile (AN), sulfolane (SL) and sultones such as 1,3-propane sultone and 1,3-propene sultone, and these organic solvents can be used alone or as a mixture of two or more. The electrolyte can also be a gelled polymer electrolyte produced by impregnating a polymer electrolyte such as polyethylene oxide and polyacrylonitrile with an electrolytic solution, or an inorganic solid electrolyte such as LiI.

In case that a lithium-titanium complex oxide having a spinel type structure according to the present invention is used as a cathode electrode material, an anode active material can be a carbon material such as graphite and coke; Li metal; and Li alloys such as Li/Al alloy, Li/In alloy and Li/Al/Mn alloy, and a charging and a discharging voltages are about 3.0 V and about 1.0 to 1.5 V, respectively.

When it is used as an anode electrode material, a cathode active material can be a lithium-containing transition metal complex oxide such as $LiCoO_2$, $LiNiO_2$, $LiMn_2O_4$, $LiMnO_2$, $LiCo_{0.5}Ni_{0.5}O_2$, $LiCo_{1/3}Ni_{1/3}Mn_{1/3}O_2$, $LiNi_{0.7}Co_{0.2}Mn_{0.1}O_2$, $LiCo_{0.9}Ti_{0.1}O_2$, $LiCo_{0.5}Ni_{0.4}Zr_{0.1}O_2$, $LiFePO_4$ and $LiFe_{1-x}Co_xPO_4$, and a charging voltage and a discharging voltage are about 2.5 to 3.0 V and about 2 to 2.5 V, respectively. These cathode active materials are electrode materials expected for a lithium-ion secondary battery which is required to have high load property and can provide a lithium secondary battery.

EXAMPLES

There will be described the present invention with reference to, but not limited to, Examples and Comparative Examples.

Fine carbon fibers used in Examples are as follows.

Reference Example (i) fine carbon fiber A: fine carbon fiber having a graphite bell-shaped structural unit In 500 mL of ion-exchange water were dissolved 115 g of cobalt nitrate [$Co(NO_3)_2 \cdot 6H_2O$: molecular weight: 291.03] (0.40 moles) and 102 g of magnesium nitrate [$Mg(NO_3)_2 \cdot 6H_2O$: molecular weight: 256.41] (0.40 moles), to prepare a starting material solution (1). Separately, in 1100 mL of ion-exchange water was dissolved 220 g of ammonium bicarbonate [$(NH_4)HCO_3$: molecular weight: 79.06] powder (2.78 moles), to prepare a starting material solution (2). Then, the starting material solutions (1) and (2) were combined at a reaction temperature of 40° C., and the mixture was blended with stirring for 4 hours. The resulting precipitation was filtered, washed and dried.

The product was calcined and milled in a mortar to provide 43 g of a catalyst. A crystal lattice constant "a" (cubic system) of the spinel structure in the catalyst was 0.8162 nm, and a metal-element ratio in the spinel structure by substitutional solid solution was Mg:Co=1.4:1.6.

A quartz reaction tube (inner diameter: 75 mmφ), height: 650 mm) was stood and a support made of a quartz wool was placed in its central part, and 0.9 g of the catalyst was dispersed over the support. After the interior of the furnace was heated to 550° C. under a He atmosphere, a mixed gas of CO and $H_2$ (volume ratio: $CO/H_2$=95.1/4.9) was fed as a source gas from the lower part of the reaction tube at a flow rate of 1.28 L/min for 7 hours, to synthesize a fine carbon fiber agglomerate.

Its yield was 53.1 g, and an ash content was determined to be 1.5% by weight. As determined by XRD analysis of the product, an observed peak half width W (degree) was 3.156 and $d_{002}$ was 0.3437 nm. FIG. 3 shows a TEM image of the fine carbon fiber A produced in this reference example. From the TEM images, parameters related to the dimensions of temple-bell-shaped structural units constituting the fine carbon fiber thus obtained and the aggregate of these were D=12 nm, d=7 nm, L=114 nm, L/D=9.5, and θ was 0 to 7° and about 3° on an average. A stack number of the temple-bell-shaped structural units forming the aggregate was about 10. Here, D, d and θ were determined for three points (¼)L, (½)L and (¾)L from the head-top of the aggregate.

(ii) fine carbon fiber B: concentric multilayer carbon nanotube (Aldrich)

An agglomerate formed by gathering fine carbon fibers with an outer diameter of 5 to 25 nm, an inner diameter of 3 to 10 nm, a layer number of 3 to 17, a length of 0.5 to 10 μm and an aspect ratio of 50 to 400 as a fluff ball (outer diameter of the fluff ball: 5 to 100 μm, hole diameter: 500 nm).

Example 1

Figure 5:
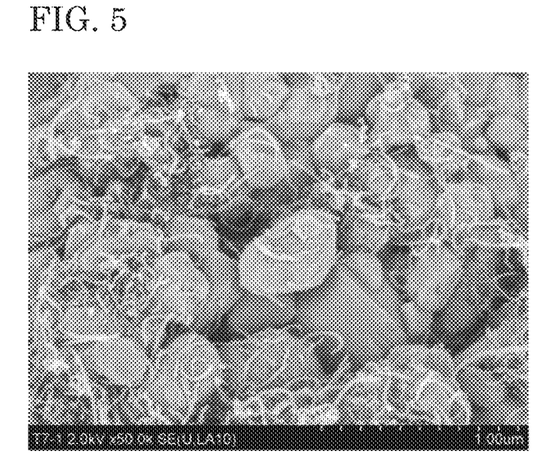
FIG. 5 is an SEM photographic image of a lithium-titanium complex oxide composited with fine carbon fiber A produced in Example 1.

To 100 parts by weight of anatase-type titanium dioxide particles [$TiO_2$: molecular weight 79.8658](Sakai Chemical Industry Co., Ltd., SA-1, average primary particle size: 0.15 μm, specific surface area: 9.7 $m^2/g$) were added 2.35 parts by weight of the fine carbon fiber agglomerate A (2% by weight based on the total amount of lithium titanate) and an appropriate amount of ethanol as a solvent, and the mixture was stirred at a rotation number of 250 RPM for 30 min using an agate ball centrifugal planetary mill having a body inner diameter of 5 cm. The ball used was made of agate and had a diameter of 10 mm. After the mixing, the solvent was evaporated at 100° C. To the titanium dioxide particle mixture which was coated by the dispersed fine carbon fiber A was added 42.0 parts by weight of lithium hydroxide [$LiOH \cdot H_2O$: molecular weight: 41.96362] (Honjo Chemical Corporation, coarse granulate) (Li/Ti molar ratio: 0.80), and the mixture was stirred for 10 min using a centrifugal planet mill and the resulting mixture was used as a starting material in calcination. The mixture was placed in an alumina box sagger, and calcined at 800° C. for 180 min under a nitrogen gas atmosphere. The lithium-titanium complex oxide particles composited with the fine carbon fiber A after calcination was observed by scanning electron microscopy (Hitachi High-Technologies Corporation, S-4800), showing that the fine carbon fiber A was incorporated into the interfaces and the insides of the particles and uniformly dispersed over the whole viewing field as shown in FIG. 5. In terms of analysis of the lithium-titanium complex oxide composited with the fine carbon fiber, an average particle size quantified using a laser diffraction/scattering type particle size analyzer Microtrac MT3300EXII (Nikkiso Co., Ltd.) was 250 nm; a specific surface area which was determined by drying and degassing the sample under a nitrogen gas stream at 100° C. for 30 min and then by a BET 1-point continuous method using Macsorb HM•model 1208 (MOUNTECH Co., Ltd.) was 11 $m^2/g$; and X-ray diffraction crystal structure analysis (XRD) indicated a single phase of $Li_4Ti_5O_{12}$. The lithium-titanium complex oxide particle composited with the fine carbon fiber A as a network was pressurized at 100 $kg/cm^2G$, and measured by a DC (direct-current) resistance meter, giving a volume resistivity of $2 \times 10^3$ Ω·cm.

Examples 2 to 7

Lithium titanate complex oxide particles composited with a fine carbon fiber was produced as shown in Table 1 using the titanium dioxide particles as used in Example 1 and fine carbon fiber A or B, varying a content of the fine carbon fiber and the calcination conditions, and an average particle size, a specific surface area, a crystal structure and a volume resistivity of each sample were measured as described in Example 1. The preparation conditions and the physical properties are shown in Table 1.

Comparative Example 1

Lithium-titanium complex oxide particles were prepared as described in Example 1, without adding a fine carbon fiber, and an average particle size, a specific surface area, a XRD crystal structure and a volume resistivity of the sample were measured. The results are shown in Table 1.

TABLE 1

| Example/ Comparative Example | Fine carbon fiber (% by weight) | Calcination temperature (° C.) | Calcination time (min) | Average particle size (nm) | Specific surface area ($m^2/g$) | Crystal structure by XRD peak ratio of $Li_4Ti_5O_{12}$/ $TiO_2$ and others | Surface resistivity (Ω · cm) |
|---|---|---|---|---|---|---|---|
| Example 1 | A(2) | 800 | 180 | 250 | 11 | $Li_4Ti_5O_{12}$ single phase | $2 \times 10^3$ |
| Example 2 | A(2) | 700 | 270 | 200 | 15 | 100/3(anatase, $Li_2TiO_3$) | $5 \times 10^3$ |
| Example 3 | A(2) | 900 | 90 | 400 | 7.3 | 100/2(rutile) | $1 \times 10^3$ |

TABLE 1-continued

| Example/ Comparative Example | Fine carbon fiber (% by weight) | Calcination temperature (° C.) | Calcination time (min) | Average particle size (nm) | Specific surface area ($m^2/g$) | Crystal structure by XRD peak ratio of $Li_4Ti_5O_{12}$/ $TiO_2$ and others | Surface resistivity ($\Omega \cdot cm$) |
|---|---|---|---|---|---|---|---|
| Example 4 | B(2) | 800 | 180 | 250 | 10 | $Li_4Ti_5O_{12}$ single phase | $9 \times 10^3$ |
| Example 5 | A(4) | 800 | 180 | 250 | 14 | $Li_4Ti_5O_{12}$ single phase | $2 \times 10^1$ |
| Example 6 | A(0.5) | 800 | 180 | 250 | 9.6 | $Li_4Ti_5O_{12}$ single phase | $8 \times 10^4$ |
| Example 7 | A(8) | 800 | 180 | 250 | 22 | $Li_4Ti_5O_{12}$ single phase | $4 \times 10^0$ |
| Comparative Example 1 | None | 800 | 180 | 300 | 7.8 | $Li_4Ti_5O_{12}$ single phase | $9 \times 10^6$ |

Example 8

(1) Preparation of an Aqueous Dispersion of a Fine Carbon Fiber

Five parts by weight of the fine carbon fiber A was added to 1 part by weight of carboxymethylcellulose (Daicel Finechem Ltd., CMC Daicel 1110) dissolved in 94 parts by weight of ion-exchange water and the mixture was stirred, and then the fiber was opened and dispersed for 40 min using an ultrasonic generator (Nippon Seiki CO., Ltd, Ultrasonic Homogenizer MODEL US-600T), to prepare an aqueous dispersion of the fine carbon fiber containing 5% by weight of the fine carbon fiber.

(2) Preparation of a Starting Slurry for Calcination and Production of Lithium-Titanium Complex Oxide Particles In 160 parts by weight of ion-exchange water was added 38.0 parts by weight of lithium carbonate [$Li_2CO_3$: molecular weight 73.8909] (Kennametal Inc., 60M, average primary particle size: 5.3 μm, specific surface area: 1.4 $m^2/g$) (Li/Ti molar ratio: 0.82) with stirring to prepare a solution, to which was then added 100 parts by weight of titanium dioxide particle (identical to that used in Example 1), to prepare a suspension/slurry.

To the slurry was added 46.5 parts by weight of the aqueous dispersion of the fine carbon fiber containing 5% by weight of the fine carbon fiber obtained in (1) (2% by weight to the total weight), and the mixture was blended with stirring, and the resulting slurry was spray-dried at 120° C. The dried mixture was charged in an alumina box sagger and calcined at 850° C. for 150 min under a nitrogen gas atmosphere. The lithium-titanium complex oxide composited with the fine carbon fiber had an average particle of 250 nm and a specific surface area of 11 $m^2/g$, and showed a single phase of $Li_4Ti_5O_{12}$ as determined by X-ray crystal structure analysis (XRD). The lithium-titanium complex oxide particles complexed with the fine carbon fiber A as a network was pressurized at 100 kg/$cm^2$G, and had a volume resistivity of $2 \times 10^2$ $\Omega \cdot cm$ as measured by a DC resistance meter.

Comparative Example 2

A lithium-titanium complex oxide complexed with a carbonaceous material was produced as described in Example 8, except that the fine carbon fiber was replaced with sucrose as a carbonaceous precursor. In 200 parts by weight of ion-exchange water were added 5.59 parts by weight of sucrose (carbonization rate: 42% by weight, 2% by weight to the total weight) and 38.0 parts by weight of lithium carbonate (Li/Ti molar ratio: 0.82). In the mixture was suspended 100 parts by weight of titanium dioxide particle to give a slurry, which was then spray-dried and calcined. The resulting lithium-titanium complex oxide particles had an average particle size of 250 nm and a specific surface area of 12 $m^2/g$, and showed a single phase of $Li_4Ti_5O_{12}$ as determined by XRD crystal structure analysis. A volume resistivity was $3 \times 10^5$ $\Omega \cdot cm$.

Example 9

A lithium-titanium complex oxide composited with a fine carbon fiber was produced as described in Example 8, except that the titanium dioxide in Example 8 was replaced with amorphous fine particle titanium dioxide (Nippon Aerosil Co., Ltd., AEROXIDE $TiO_2$P-25, average primary particle size: 30 nm, specific surface area: 50 $m^2/g$) having an average primary particle size of 21 nm. In 300 parts by weight of ion-exchange water was dissolved 38.0 parts by weight of lithium carbonate (Li/Ti molar ratio: 0.82) with stirring. Then, to the mixture was added 100 parts by weight of fine particle titanium dioxide to prepare a suspension/slurry. To the slurry was added 46.5 parts by weight of a 5% by weight aqueous dispersion of a fine carbon fiber (2% by weight to the total weight) with stirring, and the mixture was spray-dried at 120° C., and then calcined in a nitrogen gas atmosphere at 775° C. for 90 min. The lithium-titanium complex oxide particles complexed with the fine carbon fiber had an average particle size of 100 nm and a specific surface area of 21 $m^2/g$, and showed a single phase of $Li_4Ti_5O_{12}$ as determined by XRD crystal structure analysis. A volume resistivity was $9 \times 10^3$ $\Omega \cdot cm$.

Example 10

Using each of the electrode materials obtained in Examples and Comparative Examples as an active material, the electrode material, acetylene black (Denkikagaku Kogyo Kabushiki Kaisha, DENKA BLACK) and polyvinylidene fluoride (PVDF) (Kureha Corporation, KF polymer) was kneaded in N-methylpyrrolidone as a solvent in a weight ratio of 90:5:5 by a kneader to prepare an electrode slurry. The electrode paste was applied to an aluminum mesh substrate, which was then dried under vacuum at 150° C., to produce a cathode plate (15 mm□). Using the cathode plate, a Li plate as a counter electrode and a separator impregnated with an electrolytic solution that is 1 mol/L solution of $LiPF_6$ in a solvent comprising 1:2 of ethylene carbonate (EC) and dimethyl carbonate (DMC), a coin cell was produced and used as a non-aqueous electrolyte battery for evaluation.

These batteries were evaluated by a charge/discharge test under potential control varying a voltage within the range of 1.4 V to 2.0 V for measuring a discharge capacity. The results are shown in Table 2.

TABLE 2

| Electrode material used | Discharge capacity (0.1 C) mAhr/g | Discharge capacity (4 C) mAhr/g |
|---|---|---|
| Example 1 | 167 | 158 |
| Comparative Example 1 | 170 | 135 |
| Example 4 | 165 | 157 |
| Example 5 | 163 | 158 |
| Example 7 | 157 | 155 |
| Example 8 | 165 | 160 |
| Comparative Example 2 | 165 | 138 |
| Example 9 | 166 | 158 |

INDUSTRIAL USABILITY

In lithium titanium complex oxide particles composited with a fine carbon fiber according to the present invention, since a fine carbon fiber having a graphite structure is composited with the surface and the inside of the particles as a network, the lithium-titanium complex oxide particles, which are originally less electroconductive, is given electroconductivity, resulting in facilitating transfer of electrons and lithium ions. Thus, the present invention provides an electrode material useful as a lithium battery to which high load properties and high cycle properties are required, such as that for automobiles or tools.

DESCRIPTION OF SYMBOLS

11: structural unit
12: head-top part
13: body-part
21, 21a, 21b, 21c: aggregate

The invention claimed is:

1. An electrode material for a secondary battery wherein an inside and a surface of a lithium-titanium complex oxide is composited with a fine carbon fiber as a network,
wherein the fine carbon fiber is produced by vapor phase growth in which a graphite-net plane forms a structural unit comprising a closed head-top part and a body-part with an open lower-end, 2 to 30 of the structural units are stacked sharing a common central axis to form an aggregate, and several of the aggregates are connected in head-to-tail style with a distance to form the fiber.

2. The electrode material for a secondary battery according to claim 1, wherein the lithium-titanium complex oxide comprises spinel-type $Li_4Ti_5O_{12}$ as a main component and has an average particle size of 50 nm or more and less than 1000 nm and a specific surface area of 1 m$^2$/g or more and 30 m$^2$/g or less.

3. The electrode material according to claim 1, wherein the content of said fine carbon fiber is 0.1% by weight or more, 10% by weight or less based on the total weight of the electrode material.

4. The electrode material according to claim 1, wherein a volume resistivity is less than $10^5$ Ω·cm under a pressure of 10 MPa.

5. The electrode material according to claim 1, wherein in the fine carbon fiber, graphite AB planes (graphite basal planes) are aligned at an angle of less than 15° to a fiber-axis direction.

6. The electrode material according to claim 1, wherein in the fine carbon fiber, an end of the body-part of the aggregate has an outer diameter D of 5 to 40 nm and an inner diameter d of 3 to 30 nm, and an aspect ratio (L/D) of the aggregate is 2 to 150.

7. The electrode material according to claim 1, wherein the fine carbon fiber is produced by vapor phase growth using a catalyst containing an element-selected from the group consisting of Fe, Co, Ni, Al, Mg and Si, and an ash content in the fine carbon fiber is 4% by weight or less.

8. The electrode material according to claim 1, wherein the fine carbon fiber is produced by the method comprising feeding a mixed gas containing CO and $H_2$ onto a catalyst containing a spinel-type oxide of cobalt, in which magnesium is contained by substitution forming solid solution, to initiate a reaction and growing the fine carbon fiber.

9. The electrode material according to claim 8, wherein when the spinel-type oxide of cobalt, in which magnesium is contained by substitution forming solid solution is represented by $Mg_xCo_{3-x}O_y$, "x" which is a solid solution range of magnesium is 0.5 to 1.5.

10. A process for manufacturing an electrode material for a secondary battery in which an inside and a surface of a lithium-titanium complex oxide is composited with a fine carbon fiber as a network, comprising:
(Step a-1) kneading a fine carbon fiber agglomerate and a titanium compound under shear force to provide a mixture of an opened fine carbon fiber and the titanium compound,
(Step a-2) mixing the mixture obtained in Step a-1 and a lithium compound, and
(Step a-3) calcining the mixture obtained in Step a-2 under an inert atmosphere,
wherein the fine carbon fiber is produced by vapor phase growth in which a graphite-net plane forms a structural unit comprising a closed head-top part and body-part with open lower-end, 2 to 30 of the structural units are stacked sharing a common central axis to form an aggregate, and several of the aggregates are connected in head-to-tail style with a distance to form the fiber.

11. A process for manufacturing an electrode material for a secondary battery in which the inside and the surface of a lithium-titanium complex oxide is composited with a fine carbon fiber as a network, comprising:
(Step b-1) kneading a fine carbon fiber agglomerate, a titanium compound and a lithium compound under shear force to provide a mixture of an opened fine carbon fiber, the titanium compound and the lithium compound, and
(Step b-2) calcining the mixture obtained in Step b-1 under an inert atmosphere,
wherein the fine carbon fiber is produced by vapor phase growth in which a graphite-net plane forms a structural unit comprising closed head-top part and a body-part with an open lower-end, 2 to 30 of the structural units are stacked sharing a common central axis to form an aggregate, and several of the aggregates are connected in head-to-tail style with a distance to form the fiber.

12. A process for manufacturing an electrode material for a secondary battery in which the inside and the surface of a lithium-titanium complex oxide is composited with a fine carbon fiber as a network, comprising:
(Step c-1) opening and dispersing a fine carbon fiber agglomerate in a dispersion medium using a dispersant,
(Step c-2) blending the dispersion of the opened fine carbon fiber obtained in Step c-1, a titanium compound and a lithium compound, and
(Step c-3) calcining the mixture obtained in Step c-2 under an inert atmosphere,
wherein the fine carbon fiber is produced by vapor phase growth in which a graphite-net plane forms a structural unit comprising closed head-top part and a body-part with an open lower-end, 2 to 30 of the structural units are stacked sharing a common central axis to form an aggregate, and several of the aggregates are connected in head-to-tail style with a distance to form the fiber.

13. A process for manufacturing an electrode material for a secondary battery in which the inside and the surface of a lithium-titanium complex oxide is composited with a fine carbon fiber as a network, comprising:

(Step d-1) opening, dispersing and blending a fine carbon fiber agglomerate in a mixture of a dispersion medium, a titanium compound and a lithium compound using a dispersant, and (Step d-2) calcining the mixture obtained in Step d-1 under an inert atmosphere, wherein the fine carbon fiber is produced by vapor phase growth in which a graphite-net plane forms a structural unit comprising closed head-top part and a body-part with an open lower-end, 2 to 30 of the structural units are stacked sharing a common central axis to form an aggregate, and several of the aggregates are connected in head-to-tail style with a distance to form the fiber.

14. The manufacturing process according to claim 10, wherein the titanium compound is titanium dioxide particles and/or titanium hydroxide particles with a size of 20 nm or more and less than 500 nm, and the lithium compound is lithium carbonate and/or lithium hydroxide.

15. The manufacturing process according to claim 14, wherein the titanium dioxide is anatase-type or rutile-type titanium oxide.

16. The manufacturing process according to claim 14, wherein said titanium hydroxide is metatitanic acid or orthotitanic acid.

17. The manufacturing process according to claim 12, wherein the dispersant is carboxymethylcellulose or polyvinylpyrrolidone.

18. The manufacturing process according to claim 12, wherein the dispersion medium comprises a polar organic solvent.

19. The manufacturing process according to claim 10, wherein the calcining is conducted at a temperature of 550° C or more and less than 950° C.

\* \* \* \* \*